(12) United States Patent
Varnell

(10) Patent No.: US 11,879,787 B2
(45) Date of Patent: Jan. 23, 2024

(54) HEAT SENSOR CABLE WITH CERAMIC COIL AND EUTECTIC SALT BETWEEN INNER AND OUTER CONDUCTORS

(71) Applicant: Kidde Technologies, Inc., Wilson, NC (US)

(72) Inventor: James Allen Varnell, Black Creek, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 476 days.

(21) Appl. No.: 17/064,105

(22) Filed: Oct. 6, 2020

(65) Prior Publication Data

US 2022/0107227 A1    Apr. 7, 2022

(51) Int. Cl.
| | |
|---|---|
| *H01B 13/00* | (2006.01) |
| *H01B 13/004* | (2006.01) |
| *H01B 13/016* | (2006.01) |
| *H01B 13/22* | (2006.01) |
| *G01K 11/06* | (2006.01) |

(Continued)

(52) U.S. Cl.
CPC .............. *G01K 11/06* (2013.01); *B64D 13/00* (2013.01); *G01K 3/005* (2013.01); *H01B 13/00* (2013.01); *H01B 13/004* (2013.01); *H01B 13/016* (2013.01); *H01B 13/22* (2013.01)

(58) Field of Classification Search
CPC .... H01B 13/00; H01B 13/004; H01B 13/016; H01B 13/22
See application file for complete search history.

(56) References Cited

U.S. PATENT DOCUMENTS

| | | | | | |
|---|---|---|---|---|---|
| 3,188,617 | A | * | 6/1965 | Jones ..................... | G08B 23/00 |
| | | | | | 361/161 |
| 3,406,389 | A | * | 10/1968 | Nailen ................... | G08B 17/06 |
| | | | | | 340/596 |

(Continued)

FOREIGN PATENT DOCUMENTS

| | | |
|---|---|---|
| EP | 3009818 A1 | 4/2016 |
| GB | 839037 A | 6/1960 |

OTHER PUBLICATIONS

European Search Report; dated Feb. 16, 2022; Application No. 21200310.7; Filed: Sep. 30, 2021; 8 pages.

*Primary Examiner* — Peter Dungba Vo
*Assistant Examiner* — Jose K Abraham
(74) *Attorney, Agent, or Firm* — CANTOR COLBURN LLP

(57) ABSTRACT

Disclosed is a heat sensor cable having: a conductor defining a conductor first end and a conductor body extending by a first longitudinal span from the conductor first end to a conductor second end; a coil that is non-conductive and includes a coil first end and a coil body extending by a second longitudinal span from the coil first end to a coil second end, wherein the coil surrounds the conductor from the conductor first end to the conductor second end; an outer sheath that is conductive and includes an outer sheath first end and an outer sheath body extending by a third longitudinal span from the outer sheath first end to an outer sheath second end, wherein the outer sheath surrounds the coil from the conductor first end to the conductor second end; and an eutectic salt that is disbursed between the conductor and the outer sheath.

8 Claims, 5 Drawing Sheets

(51) Int. Cl.
*B64D 13/00* (2006.01)
*G01K 3/00* (2006.01)

(56) References Cited

U.S. PATENT DOCUMENTS

| | | | | |
|---|---|---|---|---|
| 3,540,041 A | * | 11/1970 | Payne | G08B 29/145 |
| | | | | 340/596 |
| 4,400,680 A | * | 8/1983 | Heline, Jr. | H01H 37/767 |
| | | | | 374/111 |
| 4,628,301 A | * | 12/1986 | Brown | G08B 17/06 |
| | | | | 374/170 |
| 5,294,909 A | * | 3/1994 | Frazier | G01M 3/165 |
| | | | | 374/114 |
| 5,793,293 A | * | 8/1998 | Melamud | G01K 3/005 |
| | | | | 340/596 |
| 6,326,598 B1 | | 12/2001 | Carvalho et al. | |
| 9,482,714 B2 | | 11/2016 | Rogers | |
| 9,518,872 B2 | | 12/2016 | Rogers et al. | |
| 9,590,351 B2 | | 3/2017 | Rogers | |
| 9,823,154 B2 | | 11/2017 | Norris | |
| 9,909,933 B2 | | 3/2018 | Georgoulias et al. | |
| 10,240,985 B2 | | 3/2019 | Seebaluck | |
| 2015/0369672 A1 | * | 12/2015 | Ding | G01K 13/00 |
| | | | | 374/185 |
| 2016/0103022 A1 | * | 4/2016 | Rogers | B05D 3/12 |
| | | | | 374/163 |
| 2016/0161345 A1 | * | 6/2016 | Georgoulias | G01K 7/06 |
| | | | | 374/160 |
| 2017/0108395 A1 | | 4/2017 | Rogers | |
| 2017/0268933 A1 | | 9/2017 | Seebaluck | |

* cited by examiner

HEAT SENSOR CABLE WITH CERAMIC COIL AND EUTECTIC SALT BETWEEN INNER AND OUTER CONDUCTORS

BACKGROUND

Exemplary embodiments pertain to the art of cables and more specifically to a heat sensor cable formed with a ceramic coil and a eutectic salt between inner and outer conductors.

Aircraft turbine engines are the source of "bleed air" used to support various systems on the air vehicle. The bleed air is taken from the high or low compressor sections of the turbine engine, depending upon the features and design of a particular engine. Bleed air temperatures can range from 400° F./200° C. to over 900° F./483° C. Typical aircraft systems that utilize bleed air are anti-icing, environmental control systems, cabin pressurization, powering pneumatics actuators, etc. The bleed air is routed to these systems via ducts routed through the aircraft. Temperatures in these ducts can get extremely high, and if one of the ducts were to rupture or leak, there is a high potential of causing structural damage to the aircraft.

Heat sensor cables in the form of linear overheat sensing elements are used in an Overheat Detection System (OHDS) to protect aircraft structure and equipment by detecting over-temperature conditions caused by high temperature pneumatic bleed air duct leakages or failures. A system consists of multiple "detection loops" installed in various zones of the aircraft monitored by Bleed Monitoring Computers (BMCs). Each detection loop includes one or more linear overheat sensing elements connected in series, and interfaces with aircraft wiring that is connected to the BMCs. These detection loops are installed along the bleed air ducts and sense when the local ambient temperature rises above a predetermined alarm temperature threshold, indicating that a duct leak or rupture has occurred. When an alarm condition occurs, the BMCs have the capability to shut down a portion or all of a duct, and also re-route the bleed air by way of another/alternate duct.

The alarm temperature threshold is typically determined by where the overheat sensor is located in the aircraft. For example, overheat sensor elements that are located near the aircraft engines where the bleed air originates would have a high alarm temperature threshold, but as the air travels down the duct it cools, and the alarm threshold can be at a lower temperature.

The overheat sensor element lengths can range in length from 1 foot to 16 feet. An electrical connector resides at each end of the overheat sensor element to enable it to be connected to the aircraft wiring, or to another linear overheat sensor. Some "detection loops" can be over 100 feet in length when multiple linear overheat sensors are connected in series. The overheat sensor elements may be formed by pulling a molten eutectic salt with a vacuum between a conductive sheath and a conductor wire that are separated from each other by a porous ceramic, which may be provided in the form of ceramic beads. When the sensor element rolled or coiled prior to use, the ceramic may fracture or break. The ceramic, together with the molten eutectic salt, may accumulate to cause a "log jam" of debris, causing improper/incomplete filling, creating areas that can be void or partially void of salt. Such voids may be difficult and time consuming to detect. Having an area which is void of the eutectic salt may cause a longer detection time of a bleed air duct leak or rupture.

BRIEF DESCRIPTION

Disclosed is a heat sensor cable including: a conductor defining a conductor first end and a conductor body extending by a first longitudinal span from the conductor first end to a conductor second end; a coil that is non-conductive and includes a coil first end and a coil body extending by a second longitudinal span from the coil first end to a coil second end, wherein the coil surrounds the conductor from the conductor first end to the conductor second end; an outer sheath that is conductive and includes an outer sheath first end and an outer sheath body extending by a third longitudinal span from the outer sheath first end to an outer sheath second end, wherein the outer sheath surrounds the coil from the conductor first end to the conductor second end; and an eutectic salt that is disbursed between the conductor and the outer sheath.

In addition to one or more of the above disclosed aspects of the cable, or as an alternate, the coil is non-porous.

In addition to one or more of the above disclosed aspects of the cable, or as an alternate, the coil is ceramic.

In addition to one or more of the above disclosed aspects of the cable, or as an alternate, the coil is formed as a spring.

In addition to one or more of the above disclosed aspects of the cable, or as an alternate, the outer sheath is a metal sheath.

In addition to one or more of the above disclosed aspects of the cable, or as an alternate, the outer sheath is formed of an austenitic nickel-chromium-based superalloy.

In addition to one or more of the above disclosed aspects of the cable, or as an alternate, the conductor is a wire.

In addition to one or more of the above disclosed aspects of the cable, or as an alternate, the heat sensor cable is coiled into a bulk length of greater than ten feet, so that the heat sensor cable is configured for storage.

Further disclosed is an aircraft including: an airframe; a bleed air duct distributed in the airframe and in fluid communication with an aircraft engine supported by the airframe; the heat sensor cable disclosed hereinabove, operationally connected to a blead air duct and an electronic controller of the aircraft, whereby a controller is configured for identifying for an overheat condition upon detecting an electrical short between the conductor and the outer sheath.

Further disclosed is a method of manufacturing a heat sensor cable, including: obtaining a conductor defining a conductor first end and a conductor body extending by a first longitudinal span from the conductor first end to a conductor second end; surrounding the conductor with a coil that is non-conductive and includes a coil first end and a coil body extending by a second longitudinal span from the coil first end to a coil second end, wherein the coil surrounds the conductor from the conductor first end to the conductor second end; surrounding the coil with an outer sheath that is conductive and includes an outer sheath first end and an outer sheath body extending by a third longitudinal span from the outer sheath first end to an outer sheath second end, wherein the outer sheath surrounds the coil from the conductor first end to the conductor second end; and disbursing an eutectic salt between the conductor and the outer sheath.

In addition to one or more of the above disclosed aspects of the method, or as an alternate, surrounding the coil with the outer sheath includes pulling the conductor that is surround by the coil through the outer sheath.

In addition to one or more of the above disclosed aspects of the method, or as an alternate, disbursing the eutectic salt between the conductor and the outer sheath includes: melting the eutectic salt; drawing the eutectic salt, when melted, under vacuum into the heat sensor cable, within the outer sheath, to occupy a space defined between the outer sheath, the conductor, and the coil; and cooling the eutectic salt so that it solidifies.

In addition to one or more of the above disclosed aspects of the method, or as an alternate, the method includes coiling the heat sensor cable into a bulk length of greater than ten feet so that the heat sensor cable is configured for storage.

In addition to one or more of the above disclosed aspects of the method, or as an alternate, the coil is non-porous.

In addition to one or more of the above disclosed aspects of the method, or as an alternate, the coil is ceramic.

In addition to one or more of the above disclosed aspects of the method, or as an alternate, the coil is formed as a spring.

In addition to one or more of the above disclosed aspects of the method, or as an alternate, the outer sheath is a metal sheath.

In addition to one or more of the above disclosed aspects of the method, or as an alternate, the outer sheath is formed of an austenitic nickel-chromium-based superalloy.

In addition to one or more of the above disclosed aspects of the method, or as an alternate, the conductor is a wire.

Further disclosed is a method of installing a heat sensor, including: manufacturing the heat sensor cable as disclosed hereinabove; and connecting the heat sensor cable to a controller configured for identifying for an overheat condition upon detecting an electrical short between the conductor and the outer sheath.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
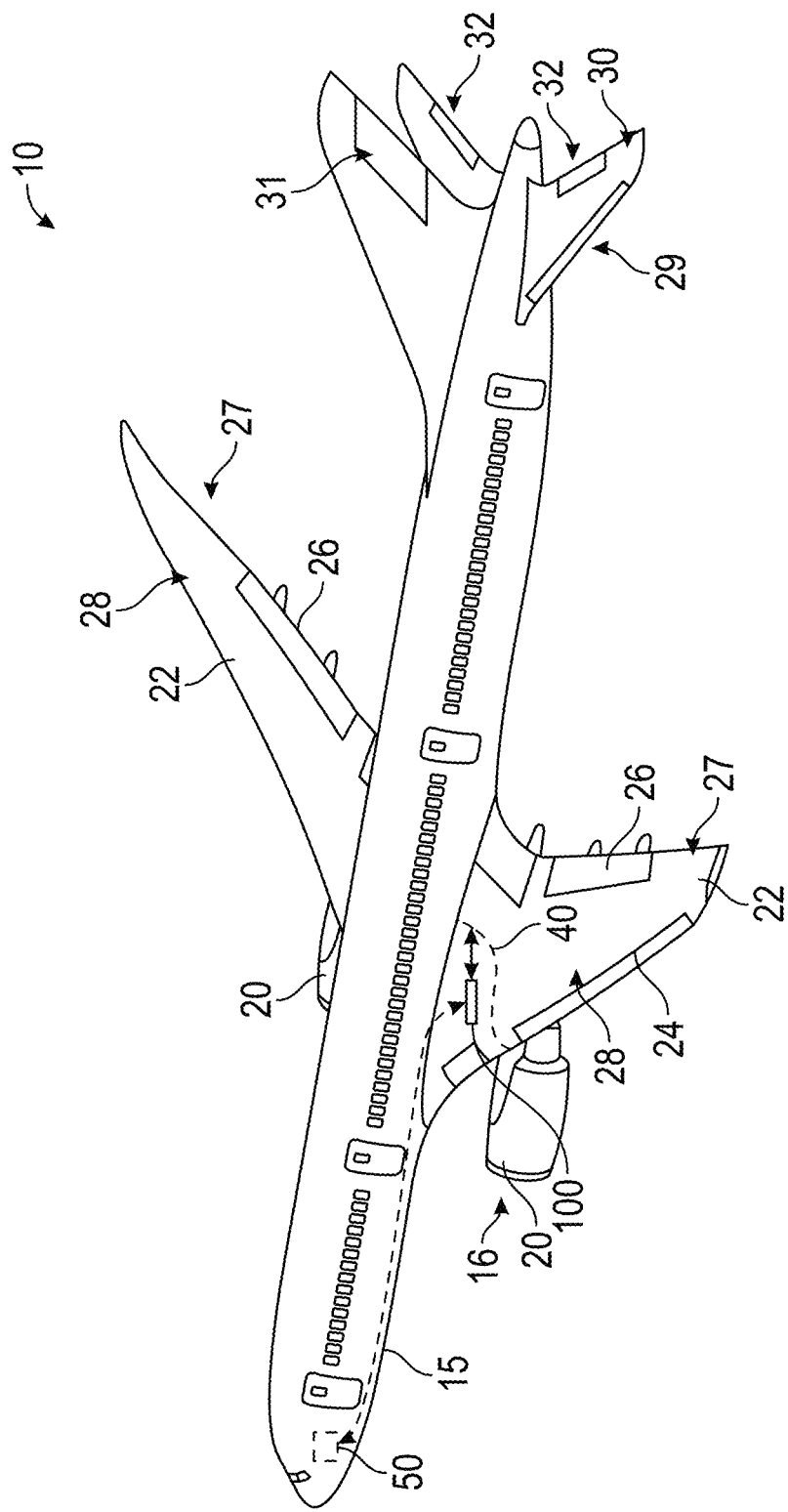
FIG. 1 is a perspective view of an aircraft that includes aerodynamic surfaces where embodiments of the present invention can be implemented.

FIG. 1 illustrates an example of a commercial aircraft 10 having an airframe 15 supporting aircraft engines 16 surrounded by (or otherwise carried in) a nacelle 20. The aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable under aircraft power systems. A bleed air duct 40 of a bleed air duct system is shown schematically. The bleed air duct 40 is fluidly connected to the aircraft engines 16. A controller 50 may be an electronic controller operationally connected to the various aircraft systems for monitoring and controlling the same. The controller 50 may be separate from or be the same as a Bleed Monitoring Computer (BMC).

Figure 2:
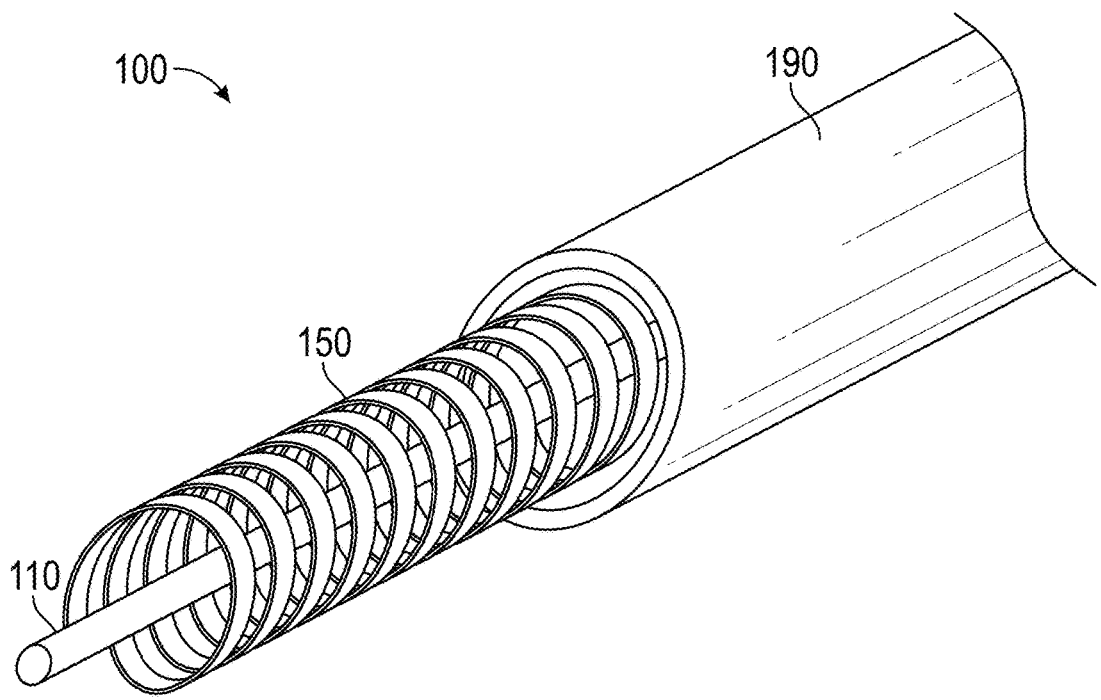
FIG. 2 is a perspective view of a heat sensor cable including a coil and conductor being drawn into a sheath.
Figure 3:
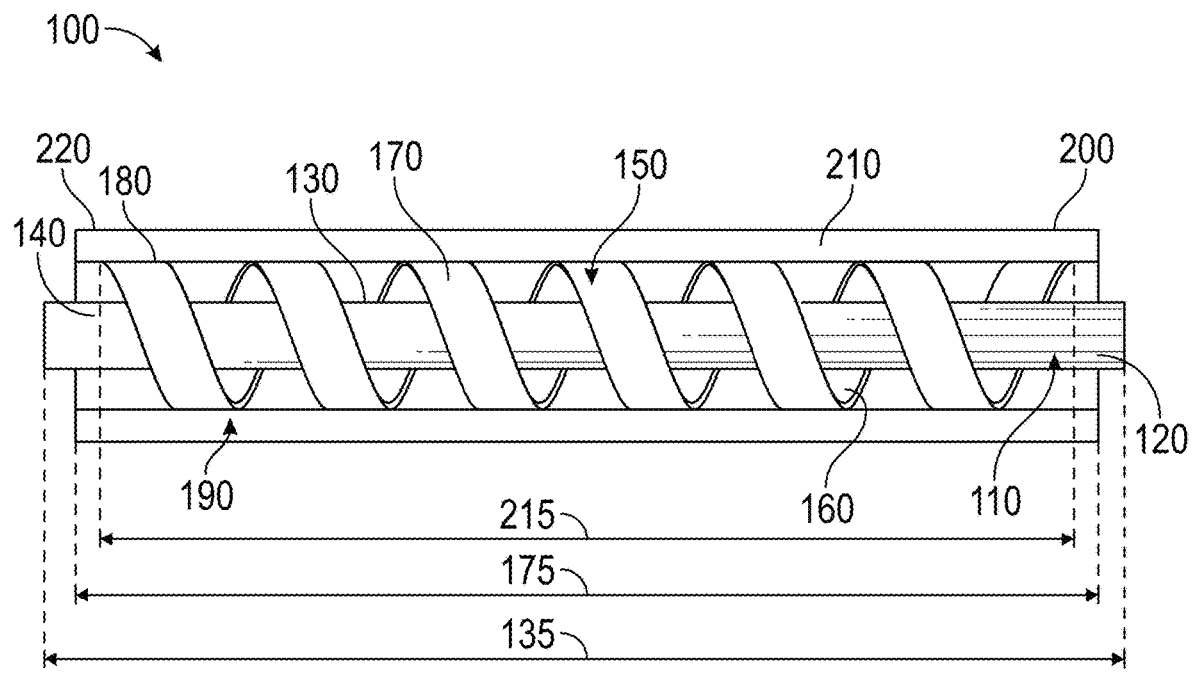
FIG. 3 is a cross sectional side view of the heat sensor cable including the coil and conductor within the sheath.

A heat sensor cable 100 utilized as an overheat detection element, or overheat detection system, is shown in FIGS. 2-5. The heat sensor cable 100 includes a conductor (otherwise referred to as a center conductor or inner conductor) 110. As shown in FIG. 2, the conductor 110 defines a conductor first end 120 and a conductor body 130 extending by a first longitudinal span 135 from the conductor first end 120 to a conductor second end 140. According to an embodiment the conductor 110 is a wire.

Figure 4:
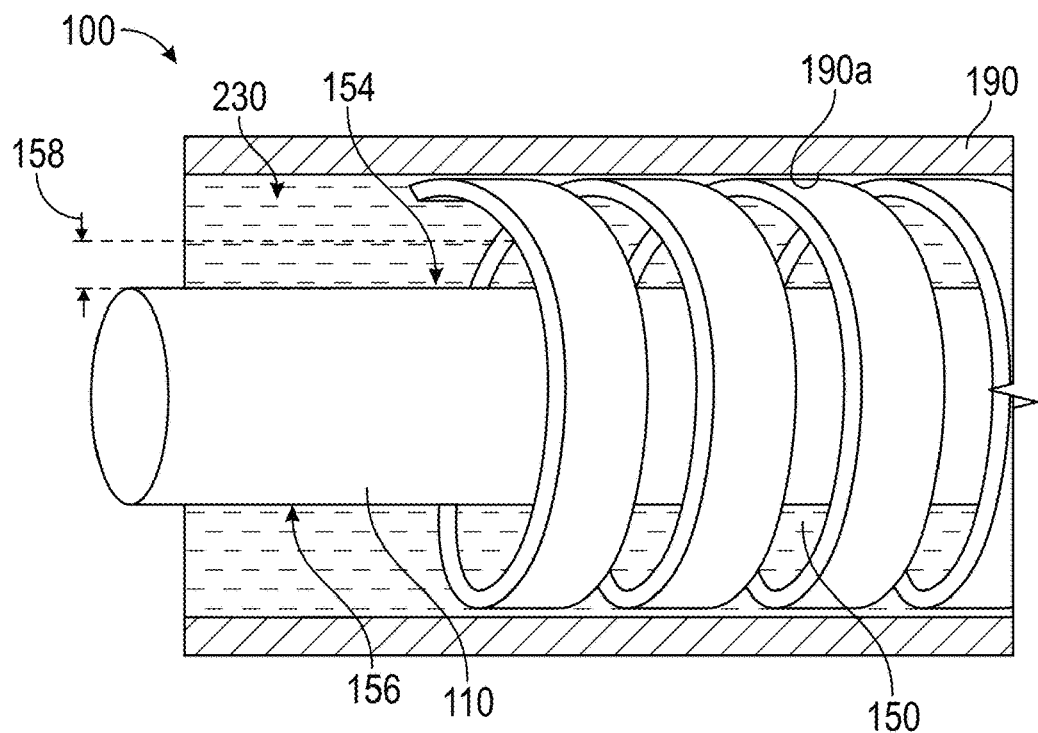
FIG. 4 is a cross sectional perspective view of the heat sensor cable including the coil, conductor and eutectic salt within the sheath.
Figure 5:
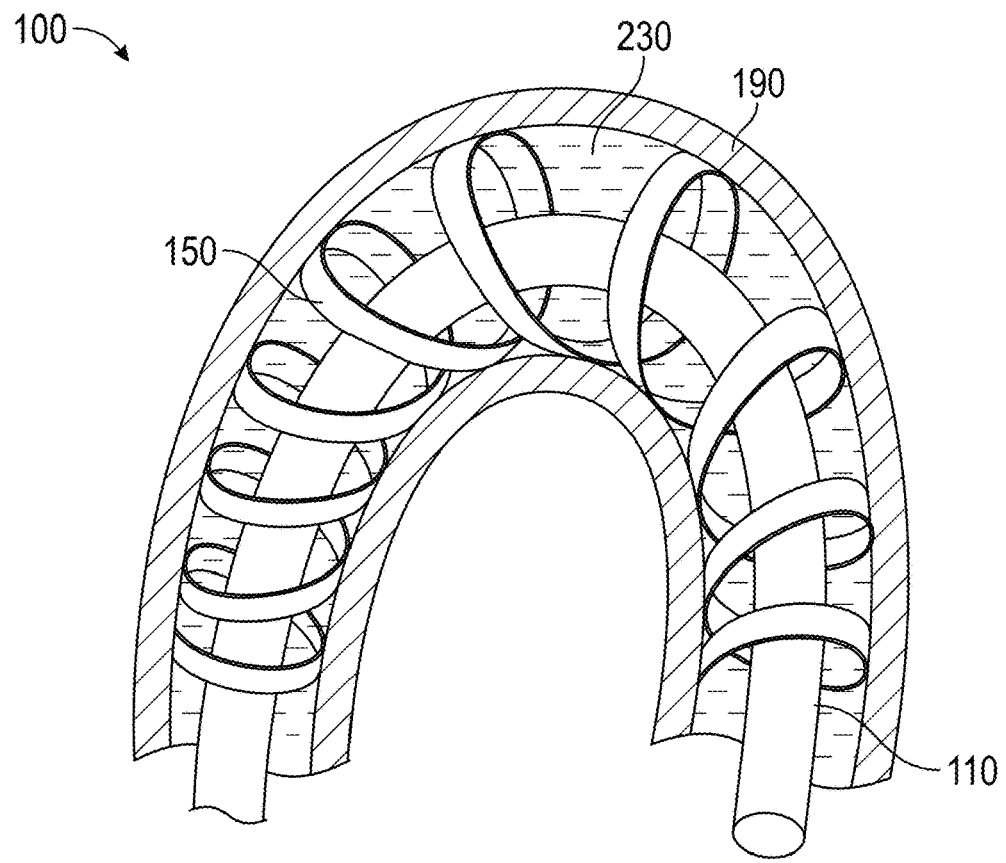
FIG. 5 is a cross sectional side view of the heat sensor cable including the coil, conductor and eutectic salt within the outer sheath, and where the system is in a wound configuration.

As shown in FIGS. 2-5, the heat sensor cable 100 includes a coil 150 that is non-conductive. As shown in FIG. 2, the coil 150 includes a coil first end 160 and a coil body 170 extending by a second longitudinal span (length) 175 from the coil first end 160 to the coil second end 180. The coil 150 surrounds the conductor 110 from the conductor first end 120 to the conductor second end 140. According to an embodiment, the coil 150 is non-porous. The coil 150 may be ceramic and may form a flexible spring. According to an embodiment, as shown in FIG. 5, an inner diameter 154 of the coil is larger than an outer diameter 156 of the conductor 110 to provide a gap 158 therebetween. By using the coil 150 according to one or more embodiments rather than the ceramic beads according to prior approaches, the voids resulting from prior approaches are avoided.

As shown in FIGS. 2-5, the heat sensor cable 100 includes an outer sheath 190 that is conductive (otherwise referred to as an outer conductor). As shown in FIG. 2, the outer sheath 190 includes an outer sheath first end 200 and an outer sheath body 210 extending by a third longitudinal span (length) 215 from the outer sheath first end 200 to an outer sheath second end 220. The outer sheath 190 surrounds the coil 150 from the conductor first end 120 to the conductor second end 140.

As shown, a length of the conductor 110 is greater than the outer sheath 190, which is greater than the coil 150. However, this is not intended on limiting the scope of the disclosure.

According to an embodiment, the outer sheath 190 may be a metal sheath. For example, the outer sheath 190 may be formed of an austenitic nickel-chromium-based superalloy. More specifically, the outer sheath 190 may be an Inconel tube. Inconel is a registered trademark of Special Metals Corporation, headquartered in New Hartford, New York, U.S.A., for a family of austenitic nickel-chromium-based superalloys. Inconel alloys are oxidation-corrosion-resistant materials well suited for service in extreme environments subjected to pressure and heat. When heated, Inconel forms a thick, stable, passivating oxide layer protecting the surface from further attack. Inconel retains strength over a wide temperature range, attractive for high temperature applications where aluminum and steel would succumb to creep as a result of thermally induced crystal vacancies. Inconel's high temperature strength is developed by solid solution strengthening or precipitation hardening, depending on the alloy.

As shown in FIGS. 4-5, the heat sensor cable 100 includes an eutectic salt 230. The eutectic salt 230 may be disbursed between the conductor 110 and an inner surface 190a (FIG. 4) of the outer sheath 190. The eutectic salt 230 may be melted, inserted under vacuum pressure and then cooled. The gap 158 between the conductor 110 and the outer sheath 190 may enhance the ability of the eutectic salt 230 to disburse within the heat sensor cable 100.

According to an embodiment, the heat sensor cable 100 may be coiled into a bulk length of greater than ten feet, for example one hundred feet, so that the heat sensor cable 100 is configured for storage.

Turning back to FIG. 1, in one embodiment, the heat sensor cable 100 is operationally connected to the blead air duct 40 and the controller 50 of the aircraft 10. The controller 50 may be configured for identifying for an overheat condition upon detecting an electrical short between the conductor 110 and the outer sheath 190 based on a melting of the eutectic salt 230.

Figure 6:
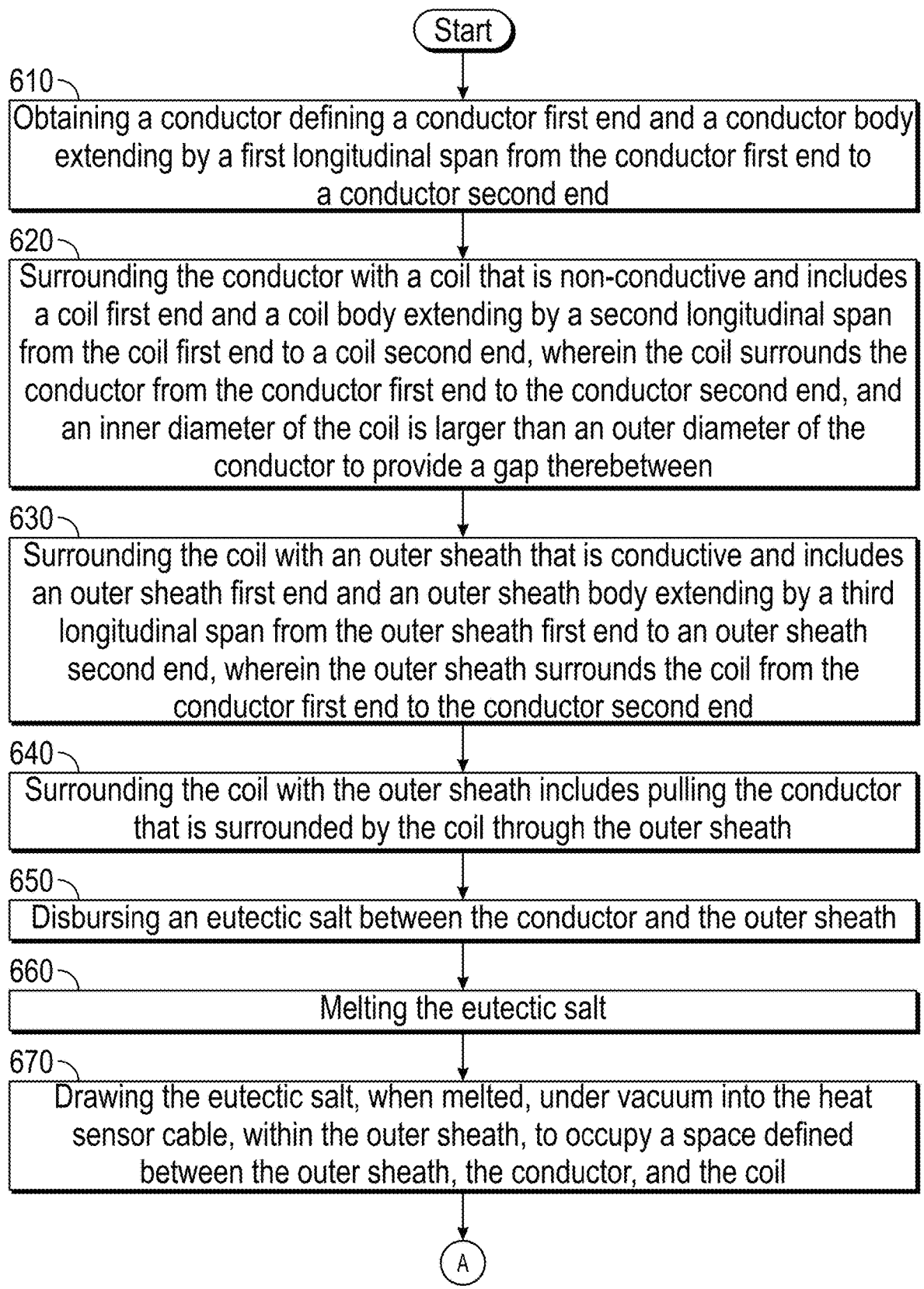
FIG. 6 is a block diagram showing a method of fabricating the detection heat sensor cable including the coil, conductor and eutectic salt within the sheath.
Figure 6:
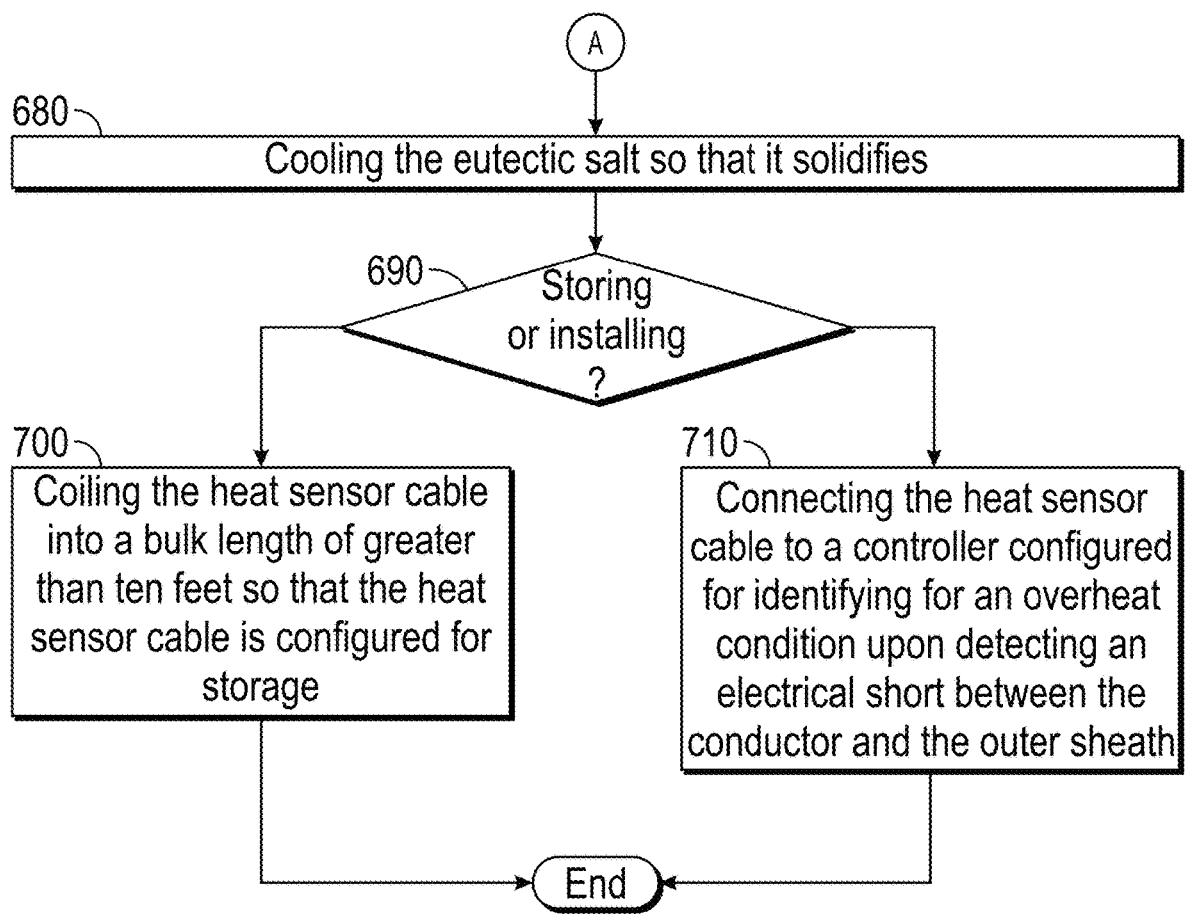

Turning now to FIG. 6, with continued reference to the above figures, a block diagram shows a method of manufacturing the heat sensor cable 100. As shown in block 610 the method includes obtaining the conductor 110 defining the conductor first end 120 and the conductor body 130 extending by the first longitudinal span 135 from the conductor first end 120 to the conductor second end 140.

As shown in block 620, the method includes surrounding the conductor 110 with the coil 150 that is non-conductive and includes the coil first end 160 and the coil body 170 extending by a second longitudinal span 175 from the coil first end 160 to the coil second end 180. The coil surrounds the conductor 110 from the conductor first end 120 to the conductor second end 140. The inner diameter 154 of the coil is larger than the outer diameter 156 of the conductor 110 to provide the gap 158 therebetween.

As shown in block 630, the method includes surrounding the coil 150 with the outer sheath 190 that is conductive and includes the outer sheath first end 200 and the outer sheath body 210 extending by the third longitudinal span 215 from the outer sheath first end 200 to the outer sheath second end 220. The outer sheath 190 surrounds the coil 150 from the conductor first end 120 to the conductor second end 140.

As shown in block 640, surrounding the coil 150 with the outer sheath 190 includes pulling the conductor 110 that is surrounded by the coil 150 through the outer sheath 190.

As shown in block 650, the method includes disbursing the eutectic salt 230 between the conductor 110 and the outer sheath 190. As shown in block 660, the method includes melting the eutectic salt 230. As shown in block 670, the method includes drawing the eutectic salt 230, when melted, under vacuum into the heat sensor cable 100, within the outer sheath 190, to occupy a space defined between the outer sheath 190, the conductor 110, and the coil 150. As shown in block 680, the method includes cooling the eutectic salt 230 so that it solidifies.

As shown in block 690, a decision is made to either store or install the heat sensor cable 100. If storing the heat sensor cable 100 is selected, then according to block 700 the method includes coiling the heat sensor cable 100 into a bulk length of greater than ten feet, for example one hundred feet, so that the heat sensor cable 100 is configured for storage. If installing the heat sensor cable 100 is selected, then according to block 710, the method includes installing a heat sensor, such as with overheat detection system in an aircraft 10, by connecting the heat sensor cable 100 to the controller 50 configured for identifying for an overheat condition upon detecting an electrical short between the conductor 110 and the outer sheath 190 via eutectic salt 230.

With the above embodiments, a coil 150 that is ceramic may be utilized, e.g., in place of known ceramic beads or ceramic tubes, to insulate the conductor 110 and outer sheath 190 from each other. The coil 150, shaped as a helix, may have enough open space around it to allow for a relatively consistent flow of melted (molten) eutectic salt 230 between the conductor 110 and the outer sheath 190 during the filling process, thus eliminating voids.

The above embodiments may enable insulating between the conductor 110 and outer sheath 190 without fracturing or void issues associated with known configurations. The embodiments may eliminate a delayed detection that may be related to the voids. The helix shape of the coil 150 flexes without breaking during the coiling process, e.g., when placed into storage or during installation, without breaking.

The outer sheath 190 of the heat sensor cable 100 disclosed herein may be an "Inconel 625" tube with a diameter of 0.088 inches. Alarm temperature settings within heat sensor cable 100 may be achieved by the use of the eutectic salt 230. The eutectic salt 230 may be designed to melt at a specific temperature (±a small tolerance). For example, alarm temperature set points can range between 180° F./82° C. to 765° F./407° C.

The eutectic salt 230 may reside within the porous non-conductive insulator (the coil 150) and also between the coil 150 and the inner surface 190a of the outer sheath 190. When the sensor element is exposed to the alarm-level temperature, the eutectic salt 230 melts and the resistance between the conductor 110 and the outer sheath 190 is reduced quickly to cause an electrical short to occur between the conductor 110 and the outer sheath 190. This condition will be detected by the controller 50 as an alarm condition, and the controller 50 will respond accordingly.

One of the benefits of the eutectic salt 230 is that when the heat sensor cable 100 cools, the eutectic salt 230 will re-solidify. This action eliminates the low resistance between the conductor 110 and the outer sheath 190. The heat sensor cable 100 will therefore be able to detect another overheat event in that location.

To effectively distribute the eutectic salt 230 within the heat sensor cable 100 during the manufacturing process, the eutectic salt 230 may be melted and drawn/pulled through heat sensor cable 100 by use of a vacuum process as indicated. The coil 150 may be provided in approximately four inches in length segments, which and may be strung end-to-end along the entire span (length) 135 of the conductor 110. After the conductor 110 is strung with the coil 150, the combined structure may be pulled through the length of the outer sheath 190. The heat sensor cable 100, which may be many feet long, may then filled with melted eutectic salt 230 via the vacuum process. The goal is to completely fill the outer sheath 190 with the melted eutectic salt 230.

A summary of the benefits of the disclosed embodiments include, for example, that the coil 150, which may not fracture into small pieces when the heat sensor cable 100 is coiled. The coil 150 may be electrically non-conductive, and may be able to withstand high temperature conditions. The gap 158 between the conductor 110 and the inner diameter 154 of the coil 150 may be sufficiently large enough to let the melted eutectic salt 230 flow within the outer sheath 190 via the vacuum process. During the fill process, the melted eutectic salt 230 fills the gaps, including gap 158, to provide a sufficient contact with the inner surface 190a of the outer sheath 190 throughout the length of the materials. The integrity of the coil 150 prevents the conductor 110 from contacting the outer sheath 190. Due to a relatively increased amount of free space within the outer sheath 190 from utilizing the coil 150, the vacuum process may pull the melted eutectic salt 230 through the heat sensor cable 100 without leaving void areas. Thus, tests for identifying void areas may be eliminated. The coil 150 may hold the conductor 110 in position and allow the eutectic salt 230 to freely flow through the heat sensor cable 100.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat sensor cable comprising:
   an inner conductor defining a conductor first end and a conductor body extending by a first longitudinal span from the conductor first end to a conductor second end;
   a coil that is non-conductive and includes a coil first end and a coil body extending by a second longitudinal span from the coil first end to a coil second end, wherein the coil surrounds the inner conductor from the conductor first end to the conductor second end, wherein the coil forms a continuous helix shape between the coil first and second ends;
   an outer sheath that is conductive and includes an outer sheath first end and an outer sheath body extending by a third longitudinal span from the outer sheath first end to an outer sheath second end, wherein the outer sheath surrounds the coil from the conductor first end to the conductor second end,
   wherein an inner diameter of the coil is larger than an outer diameter of the inner conductor to define a gap therebetween and between the inner conductor and the outer sheath; and
   an eutectic salt that is filled in the gap between the inner conductor and the outer sheath, and
   wherein the eutectic salt occupies a space defined between the outer sheath, the inner conductor and the coil.

2. The heat sensor cable of claim 1, wherein:
   the coil is non-porous.

3. The heat sensor cable of claim 2, wherein:
   the coil is ceramic.

4. The heat sensor cable of claim 3, wherein:
   the coil is formed as a spring.

5. The heat sensor cable of claim 1, wherein:
   the outer sheath is a metal sheath.

6. The heat sensor cable of claim 5, wherein:
   the outer sheath is formed of an austenitic nickel-chromium-based superalloy.

7. The heat sensor cable of claim 1, wherein:
   the inner conductor is a wire.

8. The heat sensor cable of claim 1, wherein:
   the heat sensor cable is coiled into a bulk length of greater than ten feet.

* * * * *